US008311667B2

(12) United States Patent
Kiani et al.

(10) Patent No.: US 8,311,667 B2
(45) Date of Patent: Nov. 13, 2012

(54) PROCESSING OF UNDELIVERABLE AS ADDRESSED MAIL

(75) Inventors: Shahrom Kiani, Arlington, TX (US); Carlos Macia, Plano, TX (US); Ben F Bruce, Arlington, TX (US)

(73) Assignee: Trinity Technical Group, Inc., Arlington, TX (US)

( * ) Notice: Subject to any disclaimer, the term of this patent is extended or adjusted under 35 U.S.C. 154(b) by 0 days.

(21) Appl. No.: 13/305,420

(22) Filed: Nov. 28, 2011

(65) Prior Publication Data

US 2012/0072014 A1 Mar. 22, 2012

Related U.S. Application Data

(63) Continuation of application No. 12/108,681, filed on Apr. 24, 2008, now Pat. No. 8,086,346.

(60) Provisional application No. 60/925,874, filed on Apr. 24, 2007.

(51) Int. Cl.
G06F 7/00 (2006.01)
G06K 9/00 (2006.01)

(52) U.S. Cl. ........ 700/224; 700/215; 700/223; 700/219; 209/584

(58) Field of Classification Search ........................ None
See application file for complete search history.

(56) References Cited

U.S. PATENT DOCUMENTS

| 5,422,821 | A | 6/1995 | Allen et al. |
| 5,703,783 | A | 12/1997 | Allen et al. |
| 6,508,365 | B1 | 1/2003 | Cacace-Bailey et al. |
| 6,826,548 | B2 | 11/2004 | Hungerpiller et al. |
| 6,888,084 | B1 * | 5/2005 | Bayer ............................ 209/584 |
| 7,124,948 | B2 | 10/2006 | Longacre, Jr. et al. |
| 2002/0087861 | A1 | 7/2002 | Segev et al. |
| 2003/0191651 | A1 | 10/2003 | Hungerpiller et al. |
| 2005/0199717 | A1 | 9/2005 | Park et al. |
| 2006/0080266 | A1 | 4/2006 | Kiani et al. |
| 2011/0054667 | A1 * | 3/2011 | Caillon ........................ 700/215 |

OTHER PUBLICATIONS

"U.S. Appl. No. 12/108,681 Office Action", Dec. 23, 2010, 10 pages.
"U.S. Appl. No. 12/181,884 Final Office Action", Jul. 6, 2011, 12 pages.
"U.S. Appl. No. 12/181,884 Office Action", Feb. 1, 2011, 12 pages.
"U.S. Appl. No. 12/181,884 Office Action", Mar. 19, 2012, 12 pages.

* cited by examiner

*Primary Examiner* — Gene Crawford
*Assistant Examiner* — Yolanda Jones
(74) *Attorney, Agent, or Firm* — DeLizio Gilliam, PLLC

(57) ABSTRACT

A computerized method includes sorting mail that comprises a multiple pass mail sort operation, wherein the multiple pass mail sort operation for a mail piece that is undeliverable as addressed comprises performing a first pass of the multiple pass mail sort operation, wherein performing the first pass comprises capturing data to identify a feature of the mail piece. The multiple pass mail sort operation also includes generating a first fingerprint for the mail piece between performing the first pass and performing a second pass of the multiple pass mail sort operation. The multiple pass mail sort operation also includes performing the second pass of the multiple pass mail sort operation. Performing the second pass includes determining a final disposition of the mail piece that is undeliverable as addressed.

20 Claims, 6 Drawing Sheets

PROCESSING OF UNDELIVERABLE AS ADDRESSED MAIL

RELATED APPLICATION(S)

This patent application is a continuation of U.S. patent application Ser. No. 12/108,681, entitled PROCESSING OF UNDELIVERABLE AS ADDRESSED MALL, filed Apr. 24, 2008, now allowed and which is incorporated herein by reference, which in turn claims the benefit of U.S. Provisional Application Ser. No, 60/925,874, filed on Apr. 24, 2007, which is incorporated also herein by reference.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2011, Trinity Technical Group, Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The delivery of mail includes identification and processing of mail that is undeliverable as addressed (UAA). The processing of UAA may include returning to the sender, forwarding to a different address, discarding, etc.

BRIEF DESCRIPTION OF THE DRAWINGS

The present embodiments may be better understood, and numerous objects, features, and advantages made apparent to those skilled in the art by referencing the accompanying drawings.

The embodiments are provided by way of example and not limitation in the figures of the accompanying drawings, in which like references indicate similar elements and in which.

DESCRIPTION OF EMBODIMENT(S)

Figure 1:
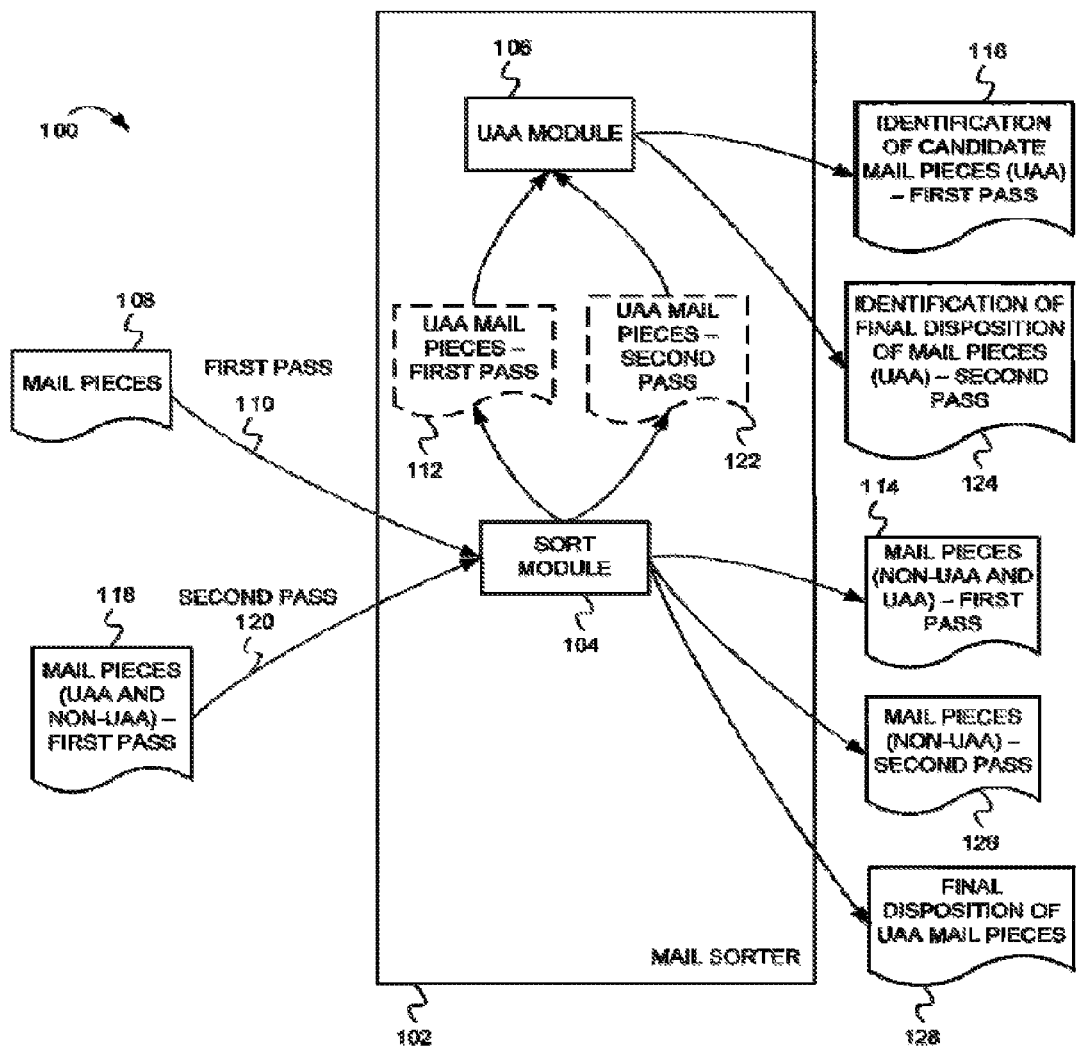
FIG. 1 is a system diagram for a multiple pass mail sort operation that includes processing undeliverable as addressed (UAA) mail pieces, according to some example embodiments.

Methods, apparatus and systems for processing undeliverable as addressed mail are described. In the following description, numerous specific details are set forth. However, it is understood that embodiments of the invention may be practiced without these specific details. In other instances, structures and techniques have not been shown in detail in order not to Obscure the understanding of this description.

Some example embodiments provide for a more efficient final disposition of UAA mail in a multiple pass mail sort operation. Some mail pieces are pre-bar coded by the sender to enable the sender to qualify for a discount for delivery of such mail. In some example embodiments, such mail comprises a bar code that comprises 11 digits that identifies the delivery point for a mail item. This bar code may include an identification of the following regarding the recipient of the mail item: (1) zip code, (2) street, and (3) location on the street (e.g., specific house on a residential street).

A mail sorter (e.g., a delivery point bar code sorter, a flat sequencing mail sorter, a parcel mail sorter, etc.) may be used to sort such mail. In certain modes of operations, the mail pieces are passed multiple times through the mail sorter to sort such mail. The multiple passes ensure that the mail pieces are in delivery sequence for mail carriers. In some example embodiments, a multiple pass sort operation includes sorting the mail in a first pass by delivery sequence of each mail carrier. In particular, the mail for the first delivery sequence of carriers are sorted by pocket #n, the second delivery sequence for all mail carriers to pocket #n+1, etc. A second pass of the multiple pass sort operation includes running the mail pieces from each first pass pocket in order and final sorting of such mail pieces to various sort pockets by the mail carrier. In particular, the mail pieces for mail carrier #c are placed in pocket #n, mail pieces for mail carrier #c+1 are placed in pocket #n+1, etc. A more detailed description of these multiple passes is set forth in U.S. Pat. No. 5,363,971; Inventors: Horace W. Weeks, James J. Strohmeyer and Jeffrey R. Nice; Assignee: United States Postal Service; Issued on Nov. 15, 1994, which is hereby incorporated by reference. Accordingly, after the second pass, the mail pieces for each mail carrier are sorted in order of their delivery sequence.

In some example embodiments, identification and final disposition of UAA mail pieces may be performed as part of this multiple pass mail sort operation. In some example embodiments, final disposition of the UAA mail pieces is integrated into the second pass of the multiple pass mail sort operation. Final disposition of a UAA mail piece may comprise forwarding, returning to sender, disposing, etc. Such embodiments are in contrast to conventional techniques for processing of UAA mail pieces. In particular, conventional techniques only identify the UAA pieces within the multiple pass mail sort operation. However, these techniques are not able to perform final disposition. Rather, using conventional techniques, final disposition of UAA mail pieces is performed in a separate process that may require human intervention for review, physical movement to a different device, etc. Such conventional techniques are, thus, time consuming and costly.

In some example embodiments, data to identify a candidate UAA mail piece is captured during the first pass of the mail sort operation. The data may be various features of a mail piece (e.g., size, return address, etc.). A fingerprint is generated based on the captured data. A more detailed description of the generation of a fingerprint is set forth in U.S. Patent Application No. 2006/0080266A1, Inventors: Shahrom Kiani, Cheryl C. Miller, Eddie Kin Hang Lui, Sekhavat Sharghi and Michael J. Cykana; Publication Date: Apr. 13, 2006, which is hereby incorporated by reference. This fingerprint may enable the unique identification of the UAA mail piece relative to the other mail pieces being attempted to be delivered to a same location (i.e., the same delivery point). In some example embodiments, the generation of the fingerprint may be performed between the first pass and the second pass. Alternatively or in addition, the generation of the fingerprint may be performed as part of the first pass or the second pass, depending on the processing power of the mail sorter. During the second pass, the fingerprint may be used in identification and final disposition of the UAA mail pieces.

FIG. 1 is a system diagram for a multiple pass mail sort operation that includes processing undeliverable as addressed (UAA) mail pieces, according to some example embodiments. FIG. 1 illustrates a system 100 that includes a mail sorter 102. The mail sorter 102 may be a delivery point bar code sorter, a flat sequencing mail sorter, or any other type of device that sorts mail pieces. In some example embodiments, the mail sorter 102 may sort the mail pieces wherein the mail pieces are processed multiple times there through. In particular, the mail pieces are passed multiple times through the mail sorter 102 to sort the mail. In some example embodiments, the mail pieces are sorted by the mail sorter 102 so that deliverable addressed as mailed pieces are sorted by mail carriers and the delivery sequence for the given mail carriers. Moreover, as further described below, as part of the second pass of the multiple pass sort operation (through the mail sorter), final disposition is made of the UAA mail pieces.

Mail sorter 102 comprises a sort module 104 and a UAA module 106. The sort module 104 and the UAA module 106 may be software, hardware, firmware or a combination thereof. While the UAA module 106 is shown as being part of the mail sorter 102, embodiments are not so limited. In some example embodiments, the UAA module 106 may be separate from the mail sorter 102. Alternatively or in addition, the functionality of the UAA module 106 may be incorporated into the sort module 104.

The sort module 104 receives and sorts the mail pieces. In some example embodiments, the sort module 104 sorts the mail pieces based on a bar code comprising an 11-digit delivery point that may include an identification of the following regarding the recipient of the mail item: (1) zip code, (2) street, and (3) location on the street (e.g., specific house on a residential street). The bar code may be pre-printed by the mailer. In some example embodiments, a given set of mail pieces are passed through the sort module 104 at least two times to sort the mail pieces accordingly to particular mail carriers and a delivery sequence for a given mail carrier.

As shown, the mail pieces 108 are passed to the sort module 106 during a first pass 110 of the multiple pass mail sort operation. The sort module 104 may identify mail pieces as candidate UAA mail pieces by comparing the 11-digit delivery point to a table, list, etc. of addresses of recipients of mail whose address has changed (hereinafter referred to as a change of address table). In particular, based on the 11-digit delivery point, the sort module 104 may be able to identify that one or more persons have changed addresses for this particular location. Multiple persons/entities may be having mail delivered to this particular location. Accordingly, one person for a given location may have changed addresses, while other persons for this location have not changed addresses. Therefore, until the recipient is identified, the mail piece is only a candidate UAA mail piece.

If the sort module 104 identifies the mail piece as a candidate UAA mail piece, the sort module 104 may pass the mail piece to the UAA module 106 for further processing (UAA mail pieces—first pass 112). In some example embodiments, the UAA module 106 may capture data that includes identifying features of the candidate UAA mail piece. In some example embodiments, the UAA module 106 may use optical character recognition or other image processing technique to capture such data. The features captured may include the size of the mail piece, the return address, etc. In order to confirm UAA and perform final disposition, the UAA module 106 may also capture data to identify the name of the recipient, the class (e.g., first class) and any endorsements on the mail piece (as further described below). Optical character recognition processing may also be used to capture such data. The UAA module 106 may output this data (identification of mail pieces (UAA)—first pass 1116). This captured data may be stored in any type of machine-readable media (internal and/or external to the mail sorter 102 (not shown)) for subsequent access during the second pass.

The sort module 104 outputs the mail pieces (both non-UAA and UAA)—114. In some example embodiments, after the first pass, the mail pieces are sorted according to the mail carrier that is to deliver such mail pieces. As further described below, in some example embodiments, the UAA module 106 performs other processing for the candidate UAA mail pieces. Such processing may be executed between the first pass and the second pass of the multiple pass mail sort operation. In some example embodiments, as part of such processing, the UAA module 106 generates a fingerprint that identifies the candidate UAA mail pieces relative to other candidate UAA mail pieces for a particular recipient. In some example embodiments, the fingerprint is derived from at least one of the delivery point, the size, return address and endorsements of a mail piece. The following are example fingerprints to help illustrate. In particular, in these examples, the fingerprint for a mail piece comprises the 11-digit delivery point, the size, the name, the return address and the endorsement. As further described below, the sort module 104 may determine uniqueness of a mail piece by reviewing certain parts of the fingerprint in a given order. In some example embodiments, if the first part of the fingerprint being reviewed is unique, the remaining parts are not reviewed. Thus, the sort module 104 reviews the parts of the fingerprint in a given order until uniqueness is found for a given mail piece. Here are example fingerprints of four mail pieces (A-D):

| Mail Piece | 11-Digit | Size | Name | Return Address | Endorsements |
|---|---|---|---|---|---|
| A | 76006-1234-12 | 15000 | Joe Simms | 94505 | None |
| B | 76006-1234-12 | 15000 | Joe Simms | 74506 | None |
| C | 76006-1234-12 | 15000 | Nancy Jones | 67902 | None |
| D | 76456-1345-11 | 16000 | John Doe | None | None |

Mail piece D may be determined to be unique by its 11-digit delivery point. In-particular, only the 11-digit delivery point would need to be checked. Mail piece A may be determined to be unique by its return address. The 11-digit delivery point, the size, the name and the return address would need to be checked. Mail piece B may be determined to be unique by its return address. The 11-digit delivery point, the size, the name and the return address would need to be checked. Mail piece C may be determined to be unique by its name. The 11-digit delivery point, the size and the name would need to be checked.

As shown, the mail pieces (both UAA and non-UAA) from the first pass are input into the sort module 104 again—second pass 120. The sort module 104 again identifies the candidate UAA mail pieces using the 11-digit delivery point data (as described above for the first pass). If the sort module 104 identifies the mail piece as a candidate UAA mail piece, the sort module 104 may pass the mail piece to the UAA module 106 for further processing (UAA pieces—second pass 122). As part of the second pass, for a candidate UAA mail piece, the UAA module 106 determines whether the UAA mail piece is confirmed to be an actual UAA mail piece. The UAA module 106 outputs an identification of the UAA mail pieces for final disposition—second pass 124.

If confirmed, the sort module 104 also performs a final disposition of the UAA mail piece—128. In some example embodiments, the confirmation of the UAA mail piece is determined based on the identification of the recipient. As described above, the name of the recipient was identified by the UAA module 106 either during the first pass or during the processing between the first pass and the second pass. The sort module 106 also outputs the mail pieces (both non-UAA and UAA)—second pass 126. In some example embodiments, after the second pass, the mail pieces are sorted according in delivery sequence for the different mail carriers that are to deliver such mail pieces.

Figure 2:
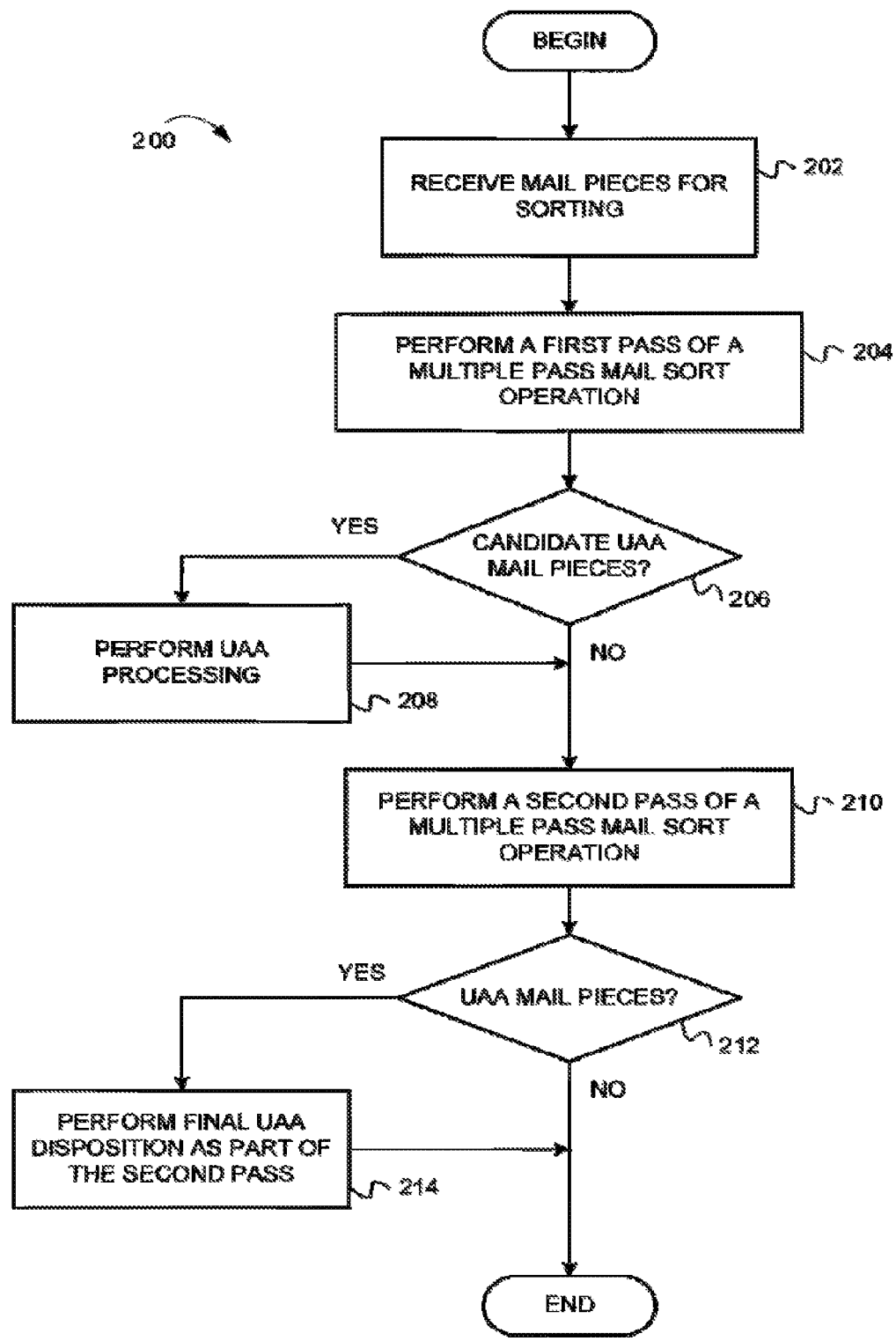
FIG. 2 is a diagram of a method for performing a multiple pass mail sort operation that includes processing UAA mail pieces, according to some example embodiments.

Operations, according to example embodiments, are now described. In certain embodiments, the operations are performed by instructions residing on machine-readable media (e.g., software), while in other embodiments, the methods are performed by hardware or other logic (e.g., digital logic). FIG. 2 is a diagram of a method for performing a multiple pass mail sort operation that includes processing UAA mail pieces, according to some example embodiments. A method 200 is described with reference to FIG. 1. In some example embodiments, the method 200 is performed by at least one of the sort module 104 and the UAA module 106. The method 200 commences at block 202.

At block 202, the sort module 104 receives the mail pieces fir sorting. The mail pieces may comprise both UAA and non-UAA mail pieces. In some example embodiments, the mail pieces are pre-bar coded by the sender of the mail pieces. The bar code may comprise an 11-digit delivery point that may include an identification of the following regarding the recipient of the mail item: (1) zip code, (2) street, and (3) location on the street. The method 200 continues at block 204.

Figure 3:
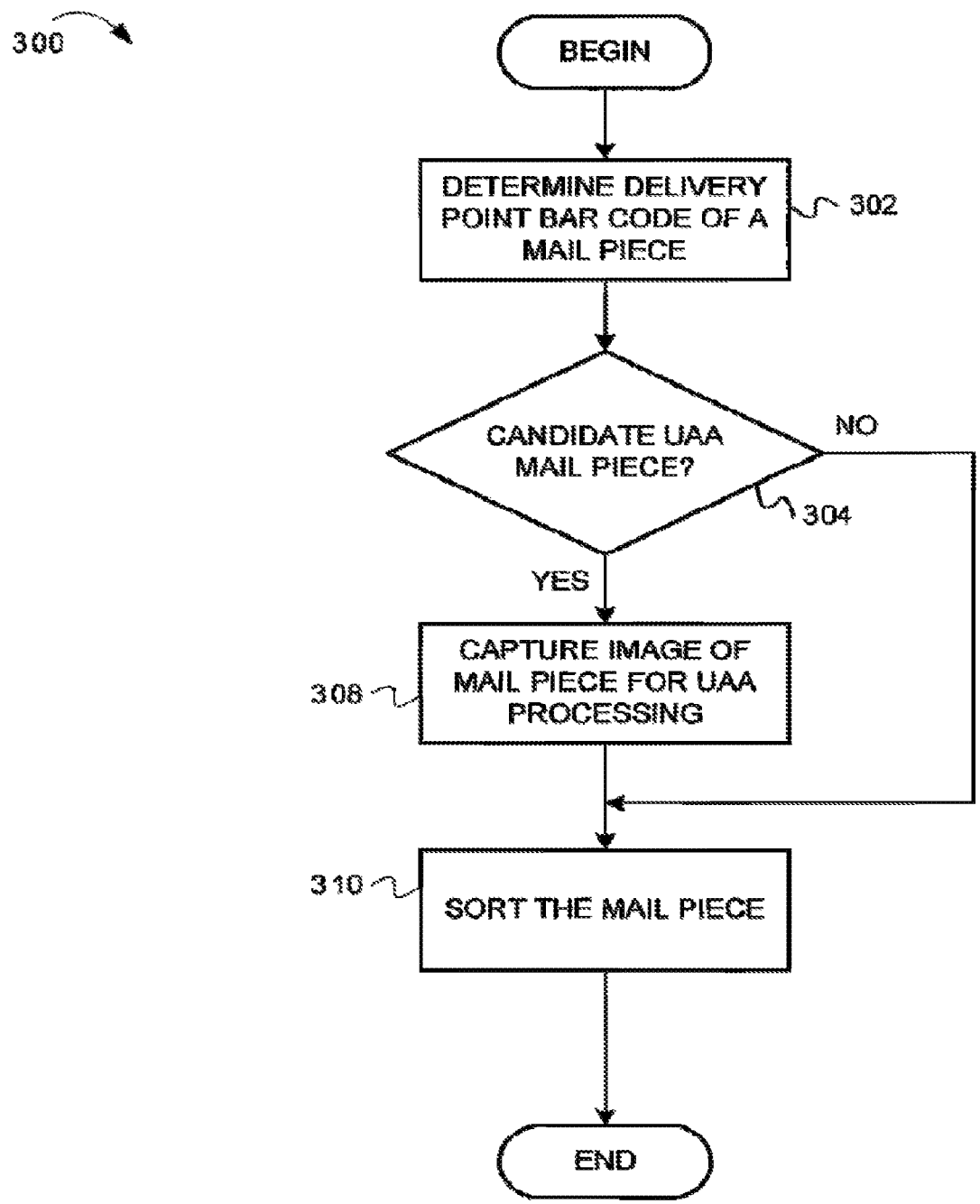
FIG. 3 is a diagram of a method for performing a first pass of multiple pass mail sort operation that includes processing UAA mail pieces, according to some example embodiments.

At block 204, the sort module 104 performs a first pass of a multiple pass mail sort operation. As part of the first pass, the sort module 104 may sort the mail pieces accordingly to the mail carrier that is to deliver the mail pieces. The sort module 104 may perform this sort using the delivery point bar code. FIG. 3 provides a more detailed description of the first pass operation (see description below). The method continues at block 206.

At block 206, the sort module 104 determines whether any of the mail pieces are candidate UAA mail pieces. In some example embodiments, the sort module 104 may identify the candidate UAA mail pieces using the delivery point bar code. In particular, the sort module 104 may compare the delivery point bar code to a table, list, etc. of addresses of recipients of mail whose address has changed. As described above, if the delivery point bar code for a mail piece is within this list of addresses, the sort module 104 identifies the mail piece as a candidate UAA mail piece. As described below, further confirmation and final disposition of a candidate UAA mail piece is performed in subsequent operations. If there are no candidate UAA mail pieces, the method 200 continues at block 210 (which is described in more detail below). Otherwise, the method 200 continues at block 208.

Figure 4:
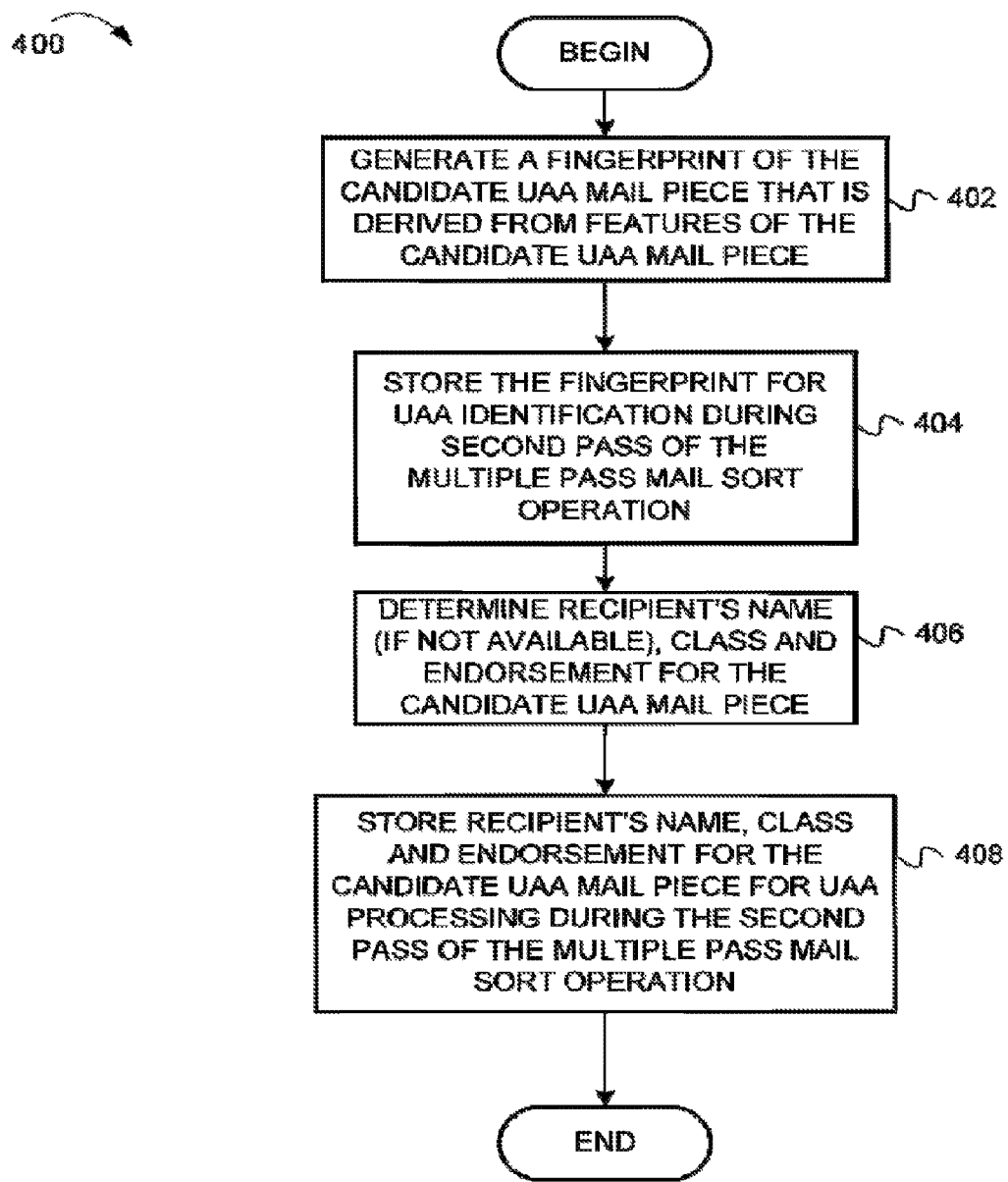
FIG. 4 is a diagram of a method for processing of UAA mail pieces that is executed between the first pass and the second pass of a multiple pass mail sort operation, according to some example embodiments.

At block 208, the UAA module 106 performs UAA processing on the candidate UAA mail pieces. In some example embodiments, this UAA processing is performed between the first pass and the second pass of the multiple pass mail sort operation. FIG. 4 provides a more detailed description of the UAA processing (see description below). The method continues at block 210.

Figure 5:
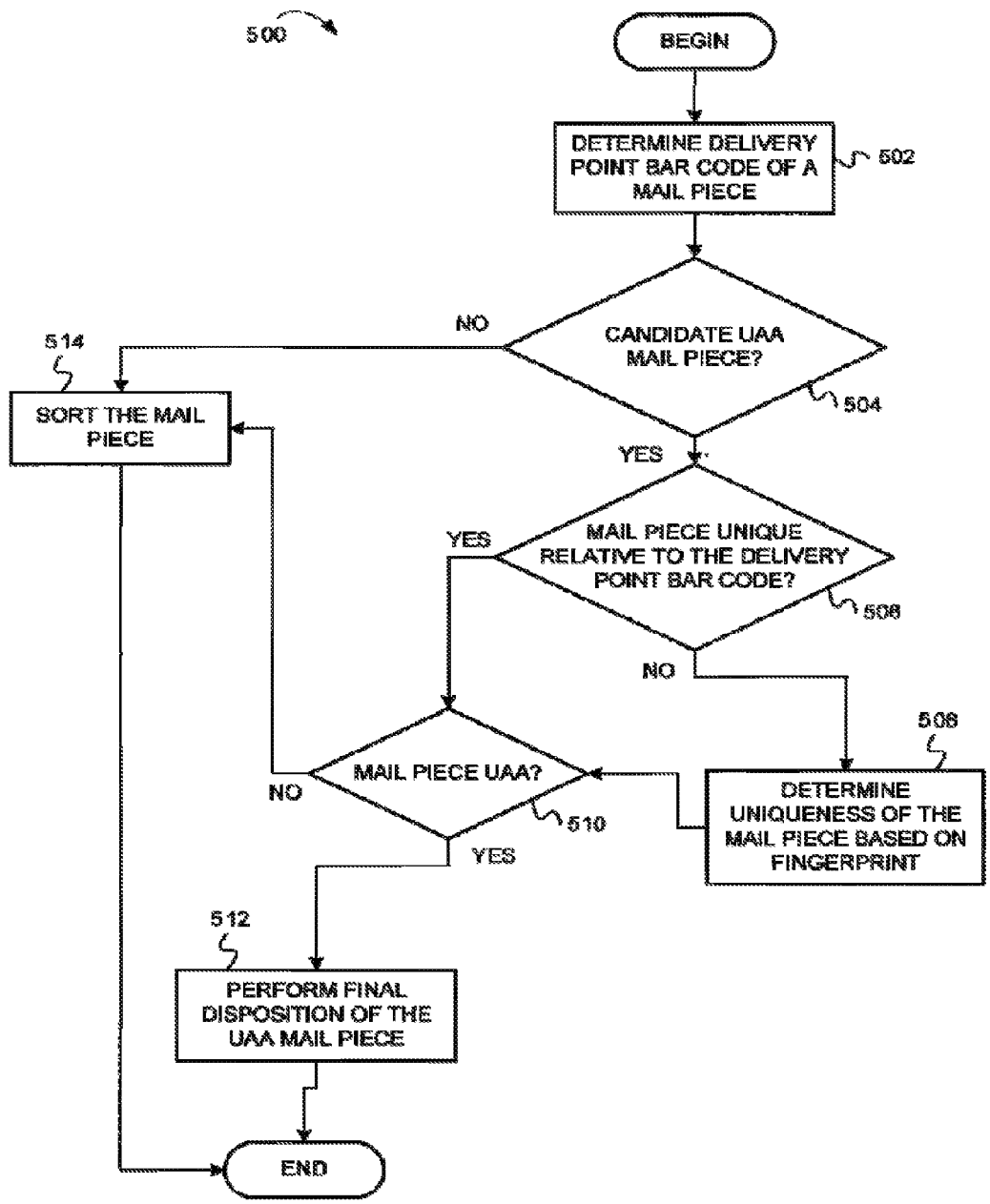
FIG. 5 is a diagram of a method for performing a second pass of multiple pass mail sort operation that includes processing UAA mail pieces, according to some example embodiments.

At block 210, the sort module 104 performs a second pass of the multiple pass mail sort operation. As part of the second pass, the sort module 104 may sort the mail pieces in order of delivery sequence for the different mail carriers. The sort module 104 may perform this sort using the delivery point bar code. FIG. 5 provides a more detailed description of the first pass operation (see description below). The method continues at block 212.

At block 212, the sort module 104 determines whether any of the mail pieces are confirmed to be UAA mail pieces. In some example embodiments, the sort module 104 may identify the UAA mail pieces using the delivery point bar code, different features of the mail piece that are included in the fingerprint, etc. A more detailed description of this identification is set forth below in the description of FIG. 5. In some example embodiments, this determination of UAA mail pieces is performed as part of the second pass. If there are no UAA mail pieces to process, the method 200 is complete. Otherwise, the method 200 continues at block 214.

At block 214, the sort module 104 performs a final UAA disposition of the UAA mail pieces as part of the second pass. Because the UAA mail pieces are confirmed, final disposition may occur. In some example embodiments, final disposition may include return the mail piece to the sender, forwarding to a new address or disposing. Final disposition may depend on the class of mail, the length of time since the address has changed, mailer applied endorsements, etc. For example, if the mail piece is first class mail and the length of time is less than 18 months, the mail piece is labeled for forwarding to the new address. If the mail piece is standard A class mail and the length of time is greater 30 days and there are no endorsements, the mail piece is discarded. Accordingly, as described, the final disposition of UAA mail pieces may be performed as part of the second pass of a multiple pass mail sort operation. The operations of the method 200 are complete.

A more detailed description of the first pass operations is now set forth. In particular, FIG. 3 is a diagram of a method for performing a first pass of multiple pass mail sort operation that includes processing UAA mail pieces, according to some example embodiments. A method 300 is described with reference to FIG. 1. In some example embodiments, the method 300 is performed by the sort module 104. For sake of clarity, the method 300 is described with reference to the processing of one mail piece, such processing is applicable to the multiple mail pieces received. The method 300 commences at block 302.

At block 302, the sort module 104 determines the delivery point bar code of a mail piece. As described above, the bar code may be an 11-digit bar code that may be placed on the mail piece by the sender. The method continues at block 304.

At block 304, the sort module 104 determines whether the mail piece is a candidate UAA mail piece. In some example embodiments, the sort module 104 may identify the candidate UAA mail pieces using the delivery point bar code. As described above, the sort module 104 may compare the delivery point bar code to a table, list, etc. of addresses of recipients of mail whose address has changed. If the mail piece is not a candidate UAA mail piece, the method continues at block 310 (which is described in more detail below). Otherwise, the method 300 continues at block 308.

At block 308, the sort module 104 captures an image of the mail piece for UAA processing. As described below, the captured image may be input into OCR/image processing to determine different features of the mail piece. Thus, the image is captured for subsequent processing. The identification of the features enable the UAA module 106 to confirm that a candidate UAA mail piece is a UAA mail piece. Also, the sort module 104 may use the identification of the features to determine final disposition of a confirmed UAA mail piece during second pass operations (as described below). The method continues at block 310.

At block 310, the sort module 104 sorts the mail piece. The sort module 104 may perform this sort using the 11-digit delivery point bar code. The output from this first pass is the mail pieces being sorted according to mail carriers that are to deliver the mail pieces. The operations of the method 300 are complete.

A more detailed description of the UAA processing that may occur between the first pass and the second pass is now set forth. In particular, FIG. 4 is a diagram of a method for processing of UAA mail pieces that is executed between the first pass and the second pass of a multiple pass mail sort operation, according to some example embodiments. A method 400 is described with reference to FIG. 1. In some example embodiments, the method 400 is performed by the UAA module 106. For sake of clarity, the method 400 is described with reference to the processing of one candidate UAA mail piece, such processing is applicable to the multiple candidate UAA mail pieces received. The method 400 commences at block 402.

At block 402, the UAA module 106 generates a fingerprint of the candidate UAA mail piece that is derived from features of the candidate UAA mail piece. Some of the features used for generating the fingerprint include the return address, size of the mail piece, etc. As described above, an image of the mail piece is captured. The UAA module 106 may use a number of different techniques (e.g., OCR) to determine features of the mail piece based on the captured image. The UAA module 106 may input the values for the features for this particular mail piece (e.g., size, data from the return address (such as the city, state, zip code, etc.)) into some type of fingerprint generation algorithm. The output from this fingerprint generation algorithm may be some alphanumeric value that is representative of the mail piece. In some example embodiments, the fingerprint may be unique relative to fingerprints for other candidate UAA mail pieces for a given delivery point bar code. Accordingly, if a location having a given delivery point bar code has multiple candidate UAA mail pieces, the fingerprints can uniquely identify the mail pieces, thereby enabling appropriate final disposition for the different mail pieces. For example, two of the UAA mail pieces may be disposed; two forwarded and one returned to the sender. The method 400 continues at block 404.

At block 404, the UAA module 106 stores the fingerprint for UAA identification during the second pass of the multiple pass mail sort operation. The UAA module 106 may store the fingerprint in a local or remote machine-readable medium relative to the mail sorter 102. The method 400 continues at block 406.

At block 406, the UAA module 106 determines the recipient's name (if not already available), the class and endorsements for the candidate UAA mail piece. The UAA module 106 may also make this determination based on captured image of the mail piece. The UAA module 106 may use a number of different techniques (e.g., OCR) to determine the class and any endorsements on the mail piece. The method continues at block 408.

At block 408, the UAA module 106 stores the recipient's name, the class and any endorsements of the candidate UAA mail piece for UAA processing during the second pass of the multiple pass mail sort operation. Similar to the fingerprint, the UAA module 106 may store the class and any endorsements for the mail piece in a local or remote machine-readable medium relative to the mail sorter 102. The method 400 is complete.

A more detailed description of the second pass operations is now set forth. In particular, FIG. 5 is a diagram of a method for performing a second pass of multiple pass mail sort operation that includes processing UAA mail pieces, according to some example embodiments. A method 500 is described with reference to FIG. 1. In some example embodiments, the method 500 is performed by the sort module 104. For sake of clarity, the method 500 is described with reference to the processing of one mail piece, such processing is applicable to the multiple mail pieces received. The method 500 commences at block 502.

At block 502, the sort module 104 determines the delivery point bar code of a mail piece. As described above, the bar code may be an 11-digit bar code that may be placed on the mail piece by the sender. The method continues at block 504.

At block 504, the sort module 104 determines whether the mail piece is a candidate UAA mail piece. In some example embodiments, the sort module 104 may identify the candidate UAA mail pieces using the delivery point bar code. As described above, the sort module 104 may compare the delivery point bar code to a change of address table. If the mail piece is not a candidate UAA mail piece, the method continues at block 514 (which is described in more detail below). Otherwise, the method 500 continues at block 506.

At block 506, the sort module 104 determines whether the candidate UAA mail piece is unique relative to the particular delivery point bar code. In particular, the sort module 104 determines whether the candidate UAA mail piece is the only mail piece (among those mail pieces being sorted) for this particular delivery point bar code. The sort module 104 may make this determination based on the data regarding delivery point bar codes for the mail pieces that was obtained during the first pass. If there is only one mail piece for this particular delivery point bar code, the mail piece is considered unique. If the mail piece is unique, the method 500 continues at block 510 (which is described in more detail below). Otherwise, the method 500 continues at block 508.

At block 508, the sort module 104 determines uniqueness of the mail piece based on the fingerprint (that was generated during the processing between the first pass and the second pass). In some example embodiments, the sort module 104 may look at only parts of the fingerprint to determine uniqueness. For example, the sort module 104 may look at the size of the mail piece. If the size of the mail piece is unique relative to other mail pieces for this delivery point, then the determination is complete. Otherwise, other parts of the fingerprint are used. For example, the sort module 104 may review different parts of the return address (name, zip code, etc.) to determine the uniqueness. In some example embodiments, if the different parts of the fingerprint of two mail pieces for a delivery point are the same, the sort module 104 may process the two mail pieces the same (e.g., the type of final disposition for UAA mail pieces). The method continues at block 510.

At block 510, the sort module 104 determines whether the mail piece is a UAA mail piece. In some example embodiments, the sort module 104 determines if the recipient's name for this mail piece is in an entry in the change of address table for this delivery point. As described above, multiple recipients of mail pieces may be associated with a given delivery point. If the recipient's name on the mail piece is in the change of address table, the mail piece is considered to be a UAA mail piece. Otherwise, the mail piece is processed as a non-UAA mail piece. If the mail piece is a non-UAA mail piece, the method continues at block 514, which is described in more detail below. Otherwise, the method continues at block 512.

At block 512, the sort module 104 performs a final disposition of the UAA mail piece. As described above (at blocks 506/508), the sort module 104 has identified the mail piece as a UAA mail piece (either because there is only one UAA mail piece for the delivery point bar code or using the fingerprint to differentiate). The sort module 104 may retrieve the class and any endorsements for this identified UAA mail piece (that were determined and stored during by the UAA module 106 during the processing between the first and second pass). As described above during this processing, the UAA module 106 may have stored such data into a UAA table for time different candidate UAA mail pieces. Thus, the sort module 104 may retrieve this data for the particular UAA mail piece. The sort module 104 may perform final disposition based on its class and any endorsements. For example regarding endorsements, an endorsement may be address service requested, change service requested, do not forward, etc. For example regarding class, if the mail piece is first class mail and the length of time is less than a given time period (e.g., 12 months, 18 months, etc.) the mail piece is labeled for forwarding to the new address. If the mail piece is standard A class mail and the length of time is greater than a given time period (e.g., 30 days, 60 days, etc.) and there are no endorsements, the mail piece is discarded. Therefore, final disposition may be various combinations depending on the class and any endorsements. Thus, in some example embodiments, final disposition may be returning to sender, forwarding to new address, discarding, notifying the sender, etc. In some example embodiments, as part of the final disposition during the second pass, the sort module 104 may label the mail piece for returning, forwarding, etc. Alternatively, the sort module 104 may just discard the mail piece during the second pass. Therefore, in contrast to conventional approaches, in some example embodiments, the final disposition is independent of application of a bar code by the multiple pass mail sort operation for identification for final disposition of the mail piece. In contrast, the fingerprint may be created between the first pass and the second pass and used in the second pass for identification for final disposition. The operations of the method 500 are complete.

At block 514, the sort module 104 sorts the mail piece. The sort module 104 may perform this sort using the delivery point bar code. The output from this second pass is the mail pieces being sorted in delivery sequence for the different mail carriers that are to deliver the mail pieces. The operations of the method 500 are complete.

Figure 6:
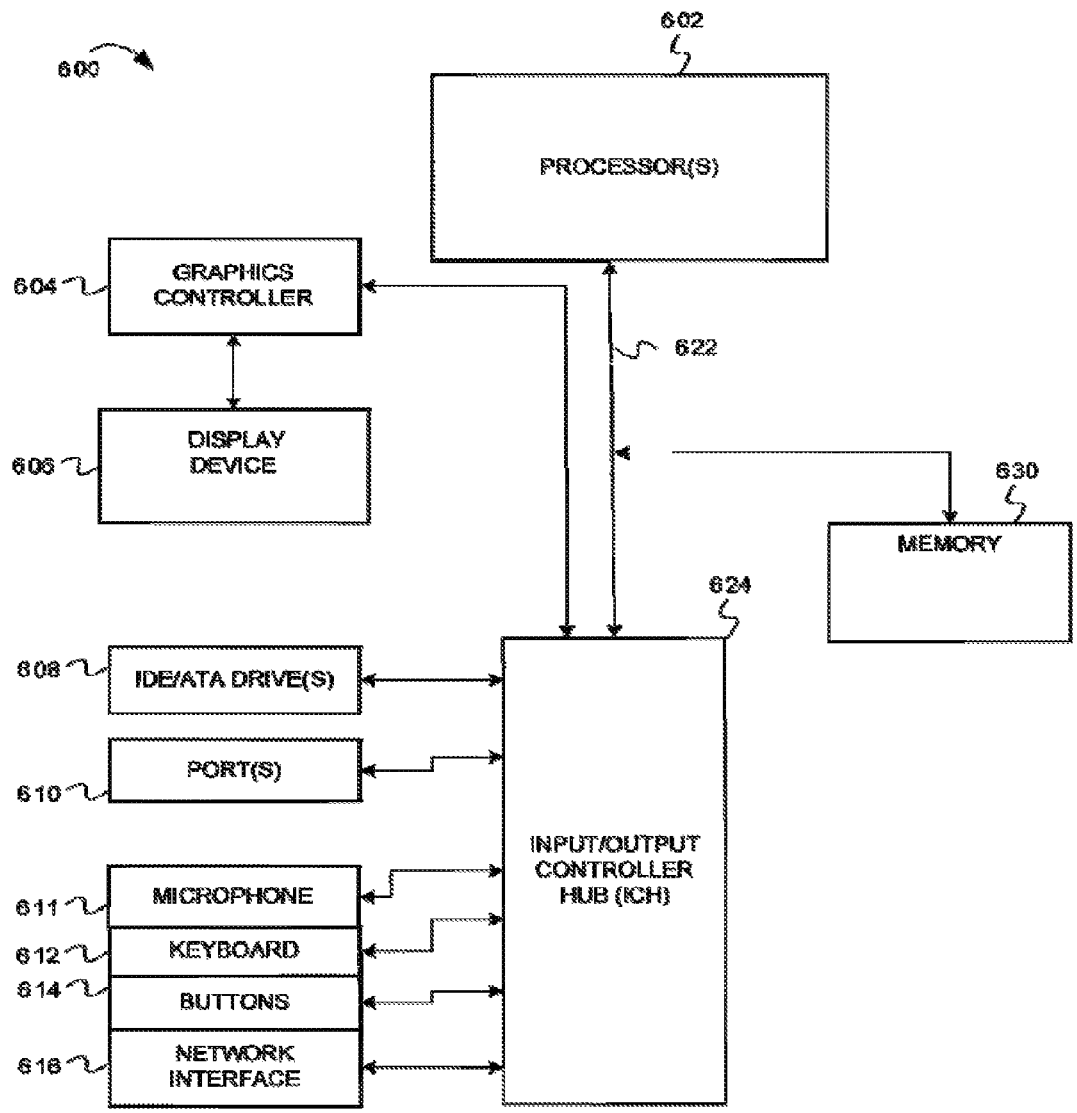
FIG. 6 illustrates a computer that may be used for comparison output of electronic documents, according to some example embodiments.

A detailed block diagram of an example computer environment, according to some embodiments, is now described. In particular, FIG. 6 illustrates a computer that may be used for processing of UAA mail pieces, according to some example embodiments. In some example embodiments, the computer system 600 may be representative of parts of the mail sorter 102, the sort module 104 or the UAA module 106.

As illustrated in FIG. 6, the computer system 600 comprises processor(s) 602. The computer system 600 also includes a memory unit 630, processor bus 622, and Input/Output controller hub (ICH) 624. The processor(s) 602, memory unit 630, and ICH 624 are coupled to the processor bus 622. The processor(s) 602 may comprise any suitable processor architecture. The computer system 600 may comprise one, two, three, or more processors, any of which may execute a set of instructions in accordance with embodiments of the invention.

The memory unit 630 may store data and/or instructions, and may comprise any suitable memory, such as a dynamic random access memory (DRAM). The computer system 600 also includes IDE drive(s) 608 and/or other suitable storage devices. A graphics controller 604 controls the display of information on a display device 606, according to some embodiments of the invention.

The input/output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. For one embodiment of the invention, the ICH 624 provides suitable arbitration and buffering for each interface.

For some embodiments of the invention, the ICH 624 provides an interface to one or more suitable integrated drive electronics (IDE) drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, a mouse 614, a CD-ROM drive 618, one or more suitable devices through one or more Firewire ports 616. For one embodiment of the invention, the ICH 624 also provides a network interface 620 though which the computer system 600 can communicate with other computers and/or devices.

In some embodiments, the computer system 600 includes a machine-readable medium that stores a set of instructions (e.g., software) embodying any one, or all, of the methodologies for described herein. Furthermore, software may reside, completely or at least partially, within memory unit 630 and/or within the processor(s) 602.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or, special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
    sorting mail that comprises a multiple pass mail sort operation, wherein the multiple pass mail sort operation for a mail piece that is undeliverable as addressed comprises,
    performing a first pass of the multiple pass mail sort operation, wherein performing the first pass comprises capturing data to identify a feature of the mail piece;
    generating a first fingerprint for the mail piece between performing the first pass and performing a second pass of the multiple pass mail sort operation, the first fingerprint being derived from the feature of the mail piece that is identified during the first pass; and
    performing the second pass of the multiple pass mail sort operation, wherein performing the second pass comprises,
        capturing data to identify the feature of the mail piece;
        generating a second fingerprint for the mail piece, the second fingerprint being derived from the feature of the mail piece that is identified during the second pass;
        comparing the second fingerprint generated during the second pass with the first fingerprint generated during the first pass to uniquely identify the mail piece;
        determining a final disposition of the mail piece that is undeliverable as addressed based on the comparing of the second fingerprint to the first fingerprint, wherein the first fingerprint is used to uniquely identify the mail piece during the determining of the final disposition, wherein determining the final disposition of the mail piece that is undeliverable as addressed is independent of use of a bar code by the multiple pass mail sort operation for identification for final disposition of the mail piece.

2. The computerized method of claim 1, wherein the feature includes at least one of a multi-digit delivery point, a name, and an endorsement.

3. The computerized method of claim 1, wherein the multiple pass mail sort operation is executed by an optical character recognition letter sorter.

4. The computerized method of claim 1, wherein the multiple pass mail sort operation is executed by a combined input output subsystem sorter.

5. The computerized method of claim 1, wherein performing the second pass requires human intervention for at least one of a review and a physical movement to a different device.

6. The computerized method of claim 1, wherein identifying the mail piece during the determining of the final disposition comprises reviewing certain parts of the first fingerprint in a given order until the mail piece is uniquely identified.

7. The computerized method of claim 1, wherein the first fingerprint is only generated for mail pieces that are candidate undeliverable as addressed mail pieces.

8. The computerized method of claim 1, wherein the feature includes at least one of a logo, a stamp, a background color, a sequence order, and a relative position.

9. A machine-readable medium including instructions which when executed by a machine causes the machine to perform operations comprising:
    sorting mail that comprises a multiple pass mail sort operation, wherein the multiple pass mail sort operation for a mail piece that is undeliverable as addressed comprises,
    performing a first pass of the multiple pass mail sort operation, wherein performing the first pass comprises capturing data to identify a feature of the mail piece;
    generating a first fingerprint for the mail piece between performing the first pass and performing a second pass of the multiple pass mail sort operation, the first fingerprint being derived from the feature of the mail piece that is identified during the first pass; and
    performing the second pass of the multiple pass mail sort operation, wherein performing the second pass comprises,
        capturing data to identify the feature of the mail piece;
        generating a second fingerprint for the mail piece, the second fingerprint being derived from the feature of the mail piece that is identified during the second pass;
        comparing the second fingerprint generated during the second pass with the first fingerprint generated during the first pass to uniquely identify the mail piece;
        determining a final disposition of the mail piece that is undeliverable as addressed based on the comparing of the second fingerprint to the first fingerprint, wherein the first fingerprint is used to uniquely identify the mail piece during the determining of the final disposition, wherein determining the final disposition of the mail piece that is undeliverable as addressed is independent of use of a bar code by the multiple pass mail sort operation for identification for final disposition of the mail piece.

10. The machine-readable medium of claim 9, wherein the feature includes at least one of a multi-digit delivery point, a name, and an endorsement.

11. The machine-readable medium of claim 9, wherein the multiple pass mail sort operation is executed by an optical character recognition letter sorter.

12. The machine-readable medium of claim 9, wherein the multiple pass mail sort operation is executed by a combined input output subsystem sorter.

13. The machine-readable medium of claim 9, wherein identifying the mail piece during the determining of the final disposition comprises reviewing certain parts of the first fingerprint in a given order until the mail piece is uniquely identified.

14. The machine-readable medium of claim 9, wherein the first fingerprint is only generated for mail pieces that are candidate undeliverable as addressed mail pieces.

15. The machine-readable medium of claim 9, wherein the feature includes at least one of a logo, a stamp, a background color, a sequence order, and a relative position.

16. An apparatus comprising:
- a mail sorter configured to receive mail and to execute a first pass and a second pass to sort the mail, wherein as part of the first pass the mail sorter is configured to capture data to identify a feature of a mail piece in response to a determination that the mail piece is a candidate undeliverable as addressed; and
- an undeliverable as addressed module is configured to generate a first fingerprint for the mail piece between the first pass and the second pass, wherein the first fingerprint is derived from the feature of the mail piece that is identified in the first pass;
- wherein as part of the second pass the mail sorter is configured to
  - capture data to identify the feature of the mail piece;
  - generate a second fingerprint for the mail piece, the second fingerprint being derived from the feature of the mail piece that is identified during the second pass;
  - compare the second fingerprint generated during the second pass with the first fingerprint generated during the first pass to uniquely identify the mail piece; and
  - determine a final disposition of the mail piece that is undeliverable as addressed based on the comparison of the second fingerprint to the first fingerprint, wherein the first fingerprint is used to uniquely identify the mail piece during the determining of the final disposition, wherein determining the final disposition of the mail piece that is undeliverable as addressed is independent of use of a bar code by the multiple pass mail sort operation for identification for final disposition of the mail piece.

17. The apparatus of claim 16, wherein the feature includes at least one of a multi-digit delivery point, a name, and an endorsement.

18. The apparatus of claim 16, wherein identification of the mail piece during the determining of the final disposition comprises review certain parts of the fingerprint in a given order until the mail piece is uniquely identified.

19. The apparatus of claim 16, wherein the first fingerprint is only generated for mail pieces that are candidate undeliverable as addressed mail pieces.

20. The apparatus of claim 16, wherein the feature includes at least one of a logo, a stamp, a background color, a sequence order, and a relative position.

* * * * *